(12) United States Patent
Sirosh

(10) Patent No.: US 9,618,157 B2
(45) Date of Patent: *Apr. 11, 2017

(54) CONCENTRIC SHELLS FOR COMPRESSED GAS STORAGE

(71) Applicant: Quantum Fuel Systems LLC, Lake Forest, CA (US)

(72) Inventor: Neel Sirosh, Irvine, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,224

(22) Filed: Dec. 4, 2015

(65) Prior Publication Data

US 2016/0084439 A1   Mar. 24, 2016

Related U.S. Application Data

(63) Continuation of application No. 13/714,700, filed on Dec. 14, 2012, now Pat. No. 9,234,625.

(51) Int. Cl.
| | | |
|---|---|---|
| *F17C 1/00* | (2006.01) | |
| *F17C 1/06* | (2006.01) | |
| *F17C 1/02* | (2006.01) | |

(52) U.S. Cl.
CPC ............... *F17C 1/06* (2013.01); *F17C 1/02* (2013.01); *F17C 2201/0104* (2013.01); *F17C 2201/0109* (2013.01); *F17C 2201/0128* (2013.01); *F17C 2201/056* (2013.01); *F17C 2201/06* (2013.01); *F17C 2203/0604* (2013.01); *F17C 2203/066* (2013.01); *F17C 2203/0619* (2013.01); *F17C 2203/0639* (2013.01); *F17C 2203/0646* (2013.01); *F17C 2203/0648* (2013.01); *F17C 2203/0656* (2013.01); *F17C 2203/0663* (2013.01); *F17C 2203/0675* (2013.01); *F17C 2209/2154* (2013.01); *F17C 2209/2181* (2013.01); *F17C 2209/234* (2013.01); *F17C 2221/012* (2013.01); *F17C 2221/033* (2013.01); *F17C 2223/0123* (2013.01); *F17C 2223/036* (2013.01); *F17C 2270/0178* (2013.01); *Y02E 60/321* (2013.01)

(58) Field of Classification Search
CPC ...... F17C 2203/0604; F17C 2203/0639; F17C 2203/0646; F17C 2223/0123; F17C 2223/035; F17C 2223/036; F17C 2201/0104
USPC ................... 220/581, 586, 588, 589
See application file for complete search history.

(56) References Cited

U.S. PATENT DOCUMENTS

| | | | |
|---|---|---|---|
| 3,773,168 A | | 11/1973 | Meinass |
| 3,785,040 A | * | 1/1974 | Pechacek ............... B21D 51/24 220/586 |

(Continued)

*Primary Examiner* — King M Chu
(74) *Attorney, Agent, or Firm* — Baker & Hostetler LLP

(57) ABSTRACT

Gas containment vessels are provided that are comprised of an inner corrosion resistant shell made of lower strength steel alloy or aluminum alloy or thermoplastic polymer, and an outer concentric shell constructed of high strength, albeit lower corrosion resistant, metal or fiber-reinforced composite. The fiber can comprise filaments derived from basaltic rocks, the filaments having been immersed in a thermosetting or thermoplastic polymer matrix, and commingled with carbon, glass or aramid fibers such that there is load sharing between the basaltic fibers and carbon, glass or aramid fibers.

4 Claims, 2 Drawing Sheets

(56) References Cited

U.S. PATENT DOCUMENTS

| | | | | |
|---|---|---|---|---|
| 4,834,065 | A | | 5/1989 | McQuade |
| 4,925,044 | A | | 5/1990 | Hembert |
| 4,964,524 | A | * | 10/1990 | Halene .................. C01B 3/0005 206/0.7 |
| 5,004,120 | A | | 4/1991 | Hembert |
| 5,150,812 | A | * | 9/1992 | Adams .................... B32B 27/08 215/12.2 |
| 5,336,720 | A | * | 8/1994 | Richards .................. C08C 1/07 525/193 |
| 6,047,747 | A | * | 4/2000 | Bowen .................. B23K 9/173 141/231 |
| 6,290,088 | B1 | * | 9/2001 | Zdunek .................... C23C 8/02 106/1.22 |
| 6,989,198 | B2 | * | 1/2006 | Masuda .................... B32B 1/08 138/141 |
| 7,147,124 | B2 | | 12/2006 | Minta et al. |
| 7,549,555 | B2 | | 6/2009 | Suzuki et al. |
| 7,681,753 | B2 | | 3/2010 | Yokota et al. |
| 7,886,940 | B2 | * | 2/2011 | Lavan .................... B65D 90/00 220/585 |
| 8,881,932 | B1 | | 11/2014 | Warner et al. |
| 2003/0066836 | A1 | * | 4/2003 | Sakaguchi ................ F17C 1/06 220/581 |
| 2004/0104235 | A1 | | 6/2004 | Sakaguchi et al. |
| 2004/0182869 | A1 | | 9/2004 | Kubo et al. |
| 2004/0206762 | A1 | | 10/2004 | Iida et al. |
| 2005/0284873 | A1 | * | 12/2005 | Albert ...................... F17C 1/08 220/581 |
| 2006/0096993 | A1 | * | 5/2006 | Takashima ................ F17C 1/06 220/588 |
| 2006/0163261 | A1 | | 7/2006 | Sugiura et al. |
| 2007/0020083 | A1 | | 1/2007 | Burgess |
| 2007/0200083 | A1 | | 8/2007 | Fritzons |
| 2009/0078706 | A1 | | 3/2009 | Ishitoya et al. |
| 2009/0152278 | A1 | | 6/2009 | Lindner |
| 2009/0266823 | A1 | | 10/2009 | Mazabraud et al. |
| 2009/0320953 | A1 | * | 12/2009 | Fletcher .................... B32B 1/08 138/148 |
| 2010/0054990 | A1 | * | 3/2010 | Williams .................. F17C 1/10 422/7 |
| 2011/0253727 | A1 | | 10/2011 | Petzendorfer et al. |
| 2012/0000916 | A1 | * | 1/2012 | Kleber .................... F16J 12/00 220/590 |
| 2013/0334231 | A1 | * | 12/2013 | Spohn .................... C23C 16/448 220/586 |
| 2014/0166670 | A1 | | 6/2014 | Sirosh |

* cited by examiner

CONCENTRIC SHELLS FOR COMPRESSED GAS STORAGE

CROSS-REFERENCE TO RELATED APPLICATIONS

This application is a Continuation of Non-Provisional patent application Ser. No. 13/714,700, filed Dec. 14, 2012, the content of which is incorporated herein by reference in its entirety.

BACKGROUND OF THE INVENTION

1. Field of the Invention

The present invention relates to high pressure gas containment devices, and in particular, natural gas and hydrogen gas storage vessels composed of concentric shells having reduced weight and at reduced cost.

2. Description of the Prior Art

The use of alternative fuels such as natural gas and hydrogen is expanding rapidly worldwide, as the growing automotive industry is seeking sustainable, ecologically cleaner, and less expensive fuels.

Natural gas and hydrogen fuel are commonly stored in pressure vessels on-board vehicles, highly compressed to improve the gravimetric energy density and volumetric storage efficiency of these gaseous fuels. Compressed gas vessels must be strong and resistant to cyclic loading, corrosive chemicals, temperature extremes, abrasion and impact loads, as well as resistant to the corrosive constituents of natural gas or hydrogen fuel.

At present, on-board fuel storage vessels can be divided into the following three types of cylindrical pressure vessels, depending on the materials used in their manufacture:

1) All-Metal: for example, 4130 steel alloy or 6061 aluminum alloy,
2) Metal-Composite: for example, 4130 alloy steel or 6061 aluminum alloy liner with carbon/glass/aramid fiber-reinforced composite overwrap, and
3) All-Composite: for example, carbon/glass/aramid fiber-reinforced composite overwrap on a thin plastic film liner.

Each of the three types of high pressure vessels is widely available in the market, and has its own set of advantages and disadvantages.

All-metal vessels are most common due to their low-cost and economies of scope with the ubiquitous industrial gas vessels. However, the heavy weight of metal vessels is a serious disadvantage in automotive on-board fuel storage applications as weight impacts vehicle fuel efficiency, payload or passenger capacity and operational characteristics.

Metal-composite vessels are built to be lighter than all-metal vessels by partially replacing metal with a lower-weight carbon, glass or aramid fiber composite overwrap. However, carbon and aramid fiber composites are very expensive compared to metals. While glass fiber is less expensive compared to carbon fiber, this material suffers from weak corrosion resistance and limited durability under high stress conditions.

All-composite vessels are significantly lighter than all-metal or metal-composite vessels by fully replacing metal with a lower-weight carbon, glass or aramid fiber composite shell, as well as replacing the metal liner with a plastic liner.

High pressure on-board fuel storage vessels—either natural gas or hydrogen cylinders—are currently required to be designed for 15-year service life, comprising up to 15,000 pressurization-depressurization cycles, while also subjected to internal and external corrosive elements, temperature extremes and mechanical damage from abrasions and impact. Such requirements restrict material choices to a limited range of metal alloys such as 4130 steel and 6061 aluminum alloys and advanced fiber-reinforced composites.

Therefore, there still remains a need for on-board fuel storage vessels that have a reduced weight compared to traditional all-metal vessels, and which have a reduced cost when compared to composite alternatives.

SUMMARY OF THE DISCLOSURE

In order to accomplish the objectives of the present invention, the present invention provides a method of construction for gas containment vessels that are comprised of an inner corrosion resistant shell made of lower strength steel alloy or aluminum alloy or thermoplastic polymer, and an outer concentric shell constructed of high strength, albeit lower corrosion resistant, metal or fiber-reinforced composite. The fiber can comprise filaments derived from basaltic rocks, the filaments having been immersed in a thermosetting or thermoplastic polymer matrix, and comingled with carbon, glass or aramid fibers such that there is load sharing between the basaltic fibers and carbon, glass or aramid fibers.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
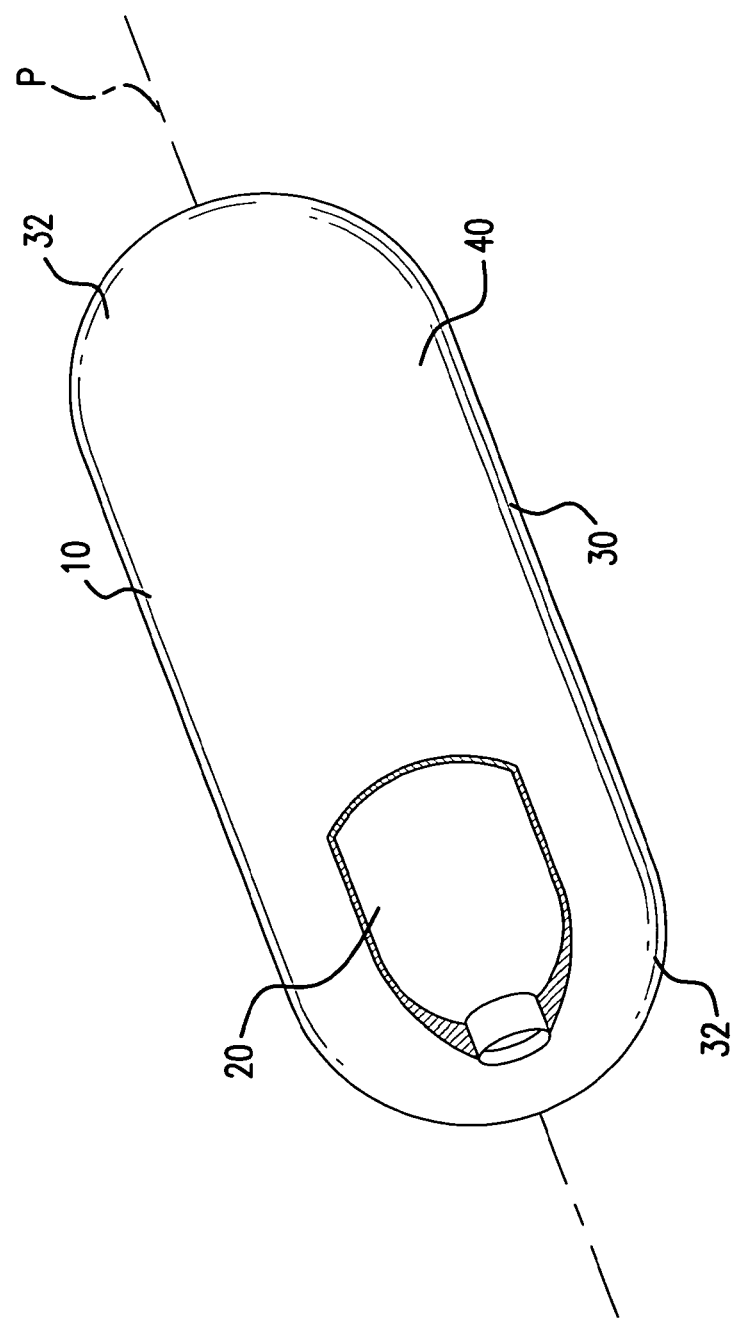
FIG. 1 is a cut-away perspective view of an implementation of a gas containment vessel with multiple concentric shells according to one embodiment of the present invention.

Referring to FIG. 1, the present invention provides a gas containment vessel 10 having two concentric shells and at least one polar opening. The gas containment vessel 10 includes an inner shell 20 that is configured to enclose a gas or liquid, and an outer shell 40 that provides additional structural support to contain the radial and axial loading from gas pressure. The gas containment vessel 10 may have one of a variety of shapes, including cylindrical, spherical, or combinations thereof. The pressure vessel 10 may be axially symmetric about a principal axis P extending along a longitudinal length of the vessel 10. The vessel 10 may include a cylindrical region 30 and two dome regions 32 at opposing ends thereof. Other shapes can be included within the current disclosure.

Metal—Metal

In one embodiment of the present invention, the inner shell 20 is made of a lower-strength and corrosion-tolerant alloy steel, such as 4130 alloy steel of approximately 700 MPa tensile strength, and the concentric outer shell 40 is made of high-strength steel of tensile strength up to 1,800 MPa in a load-sharing fashion, such that the overall weight is less than that of an all-steel vessel made of 4130 alloy steel alone. The higher strength outer shell 40 does not have to be resistant to corrosion from natural gas and hydrogen embrittlement, because the inner shell 20 is itself resistant to corrosion.

The inner shell 20 is first formed from 4130 steel or 6061 aluminum alloy tubes by closing the ends by flow-forming, or by pressing and spin-closing metal blanks. The inner shell 20 is further placed in a matching outer tube made of higher strength steel alloy and further spin-closed over the domes of the inner shell 20 using techniques that are known in the art.

As an alternative, the outer shell 40 can be made of high-strength steel sheets or steel wires that are protected from external corrosion by galvanic coating or by immersing in a polymer matrix, and wrapped over the inner shell 20 that is made of corrosion resistant 4130 steel alloy or 6061 aluminum alloy. In this case, the high strength steel wires are wound over the inner shell 20 either partially just over the straight cylindrical portion 30 or over the entire shell including the end domes 32.

Metal—Non-Metal

Figure 2:
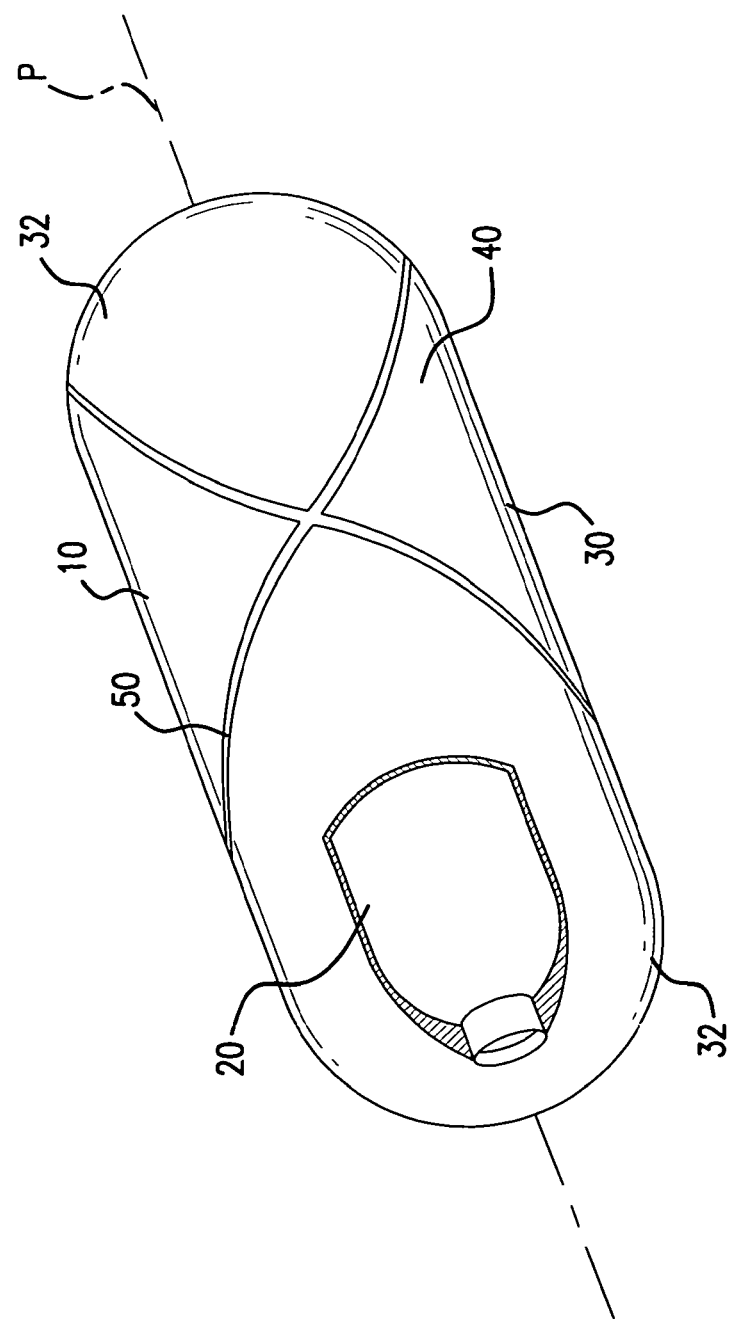
FIG. 2 is a cut-away perspective view of an implementation of a gas containment vessel with multiple concentric shells according to another embodiment of the present invention.

In another embodiment of the present invention as illustrated in FIG. 2, the inner corrosion resistant shell 20 can be made of steel or aluminum similar to the Metal—Metal configuration described above, however it is partially or fully encased in an outer shell 40 that is reinforced with filaments of 5-30 micron diameter derived from basaltic rocks, which are naturally occurring volcanic rocks that are found worldwide. The reinforcing filaments 50 can be immersed in a thermosetting or thermoplastic polymer matrix, and can be comingled with carbon, glass or aramid fibers such that there is load sharing between the basaltic fibers and carbon, glass or aramid fibers. Such a hybridized construction helps to reduce the amount of expensive fibers, such as carbon, used to construct a pressure vessel, however, it allows the application of the relatively new basaltic reinforcing fiber without relying completely on it for this safety critical pressure containment application.

Similar to the metal-metal construction described above, the inner shell 20 is first formed using corrosion resistant low-strength metals such as 4130 steel or 6061 aluminum alloy. The outer concentric shell 40 is built up over the inner shell by wrapping polymer impregnated reinforcing fibers 50 either in the straight cylindrical portion 30, or over the entire body of the inner shell 20, including the domes 32.

Non-Metal—Non-Metal

In yet another embodiment of the present invention, the inner corrosion-resistant shell 20 can be made of a thermoplastic material, and be encased in an outer shell 40 comprising filaments 50 of 5-30 microns in diameter derived from basaltic rocks. The filaments 50 can be immersed in a thermosetting or thermoplastic polymer matrix, with or without co-mingling with carbon, glass or aramid fibers. Such a comingled construction helps to reduce the amount of expensive fibers, such as carbon, used to construct a gas containment vessel, however, it allows the application of low cost and relatively new reinforcing basaltic fiber without relying completely on it for safety critical pressure containment application Similar to the metal—non-metal composite construction, the corrosion resistant inner shell 20 in this embodiment is first formed by molding a thermoplastic polymer. The outer concentric shell 40 is built up over the inner shell 20 by wrapping polymer impregnated reinforcing fibers 50 either in the straight cylindrical portion 30, or over the entire body of the inner shell 20, including the domes 32.

The polymer matrix is essentially a toughened resin formulation that is resistant to micro-cracking and crazing, and therefore help to resist the ingress of chemicals into the composite structure and protect the reinforcing fibers. Non-limiting examples of the polymer matrix include thermosetting polymers such as epoxy and vinyl ester and thermoplastic polymers such as polyethylene and polypropylene.

In addition, the filaments that are derived from basaltic rocks, which are inert, naturally occurring volcanic rocks, are environmentally friendly and non-hazardous. These fibers are made from molten basaltic rock, and typically have tensile strength of 2,900-3,200 MPa and tensile modulus of 85-95 GPa and specific gravity of 2.67 gm/cc.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A high pressure gas storage vessel, comprising:
   an inner shell made of corrosion-resistant, low strength alloy steel or aluminum alloy having approximately 700 MPa tensile strength, wherein the inner shell material is corrosion-resistant to natural gas or hydrogen fuel; and
   a concentric outer shell made of high-strength steel wires that are protected from external corrosion by immersing in a polymer matrix, with the steel wires wrapped over the inner shell;
   wherein the inner shell has a straight cylindrical portion and opposite end dome portions; and
   wherein the steel wires are wound partially just over the straight cylindrical portion and not over the entire shell including the end dome portions.

2. The vessel of claim 1, wherein the inner shell comprises 4130 alloy steel.

3. The vessel of claim 1, wherein the inner shell comprises 6061 aluminum alloy.

4. The vessel of claim 1, wherein the polymer matrix is selected from the group consisting of thermosetting polymers such as epoxy and vinyl ester, and thermoplastic polymers such as polyethylene and polypropylene.

* * * * *